United States Patent
Kim et al.

(10) Patent No.: US 10,351,049 B2
(45) Date of Patent: Jul. 16, 2019

(54) LAMP FOR VEHICLE

(71) Applicant: SL Corporation, Daegu (KR)

(72) Inventors: Hyeong Do Kim, Gyeongsangbuk-do (KR); Jong Woon Kim, Gyeongsangbuk-do (KR); Nak Jung Choi, Gyeongsangbuk-Do (KR); Ki Hae Shin, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/020,604

(22) Filed: Jun. 27, 2018

(65) Prior Publication Data

US 2019/0031087 A1    Jan. 31, 2019

(30) Foreign Application Priority Data

Jul. 28, 2017  (KR) ........................ 10-2017-0096354

(51) Int. Cl.
  *B60Q 1/14*    (2006.01)
  *F21S 41/32*   (2018.01)
  *F21S 41/141*  (2018.01)
  *F21S 41/663*  (2018.01)

(52) U.S. Cl.
  CPC ............ *B60Q 1/143* (2013.01); *F21S 41/141* (2018.01); *F21S 41/321* (2018.01); *F21S 41/663* (2018.01)

(58) Field of Classification Search
  CPC ...... B60Q 1/143; F21S 41/663; F21S 41/141; F21S 41/321
  See application file for complete search history.

(56) References Cited

U.S. PATENT DOCUMENTS

2017/0259729 A1* 9/2017 Balasundrum ........... B60Q 3/30
2019/0008020 A1* 1/2019 Pederson ........... H05B 33/0863

* cited by examiner

*Primary Examiner* — Douglas W Owens
*Assistant Examiner* — Jianzi Chen
(74) *Attorney, Agent, or Firm* — Mintz Levin Cohn Ferris Glovsky and Popeo, P.C.; Kongsik Kim

(57) ABSTRACT

The present disclosure relates to a lamp for a vehicle, and more particularly, to a lamp for a vehicle which is capable of preventing occurrence of a blind zone caused by a defect. The lamp includes a light source portion with a plurality of light emitting areas in which brightness of generated light is separately controllable and a brightness controller which is configured to cause the plurality of light emitting areas to generate light at a first brightness level to form a beam pattern and to cause at least one of the light emitting areas, which is disposed proximate to a defective area which includes at least one faulty area, to generate light at a second brightness level.

14 Claims, 17 Drawing Sheets

: FAULTY AREA

LAMP FOR VEHICLE

CROSS-REFERENCE TO RELATED APPLICATION

This application claims priority from Korean Patent Application No. 10-2017-0096354 filed on Jul. 28, 2017, the disclosure of which is incorporated herein by reference in its entirety.

BACKGROUND

1. Field of the Disclosure

The present disclosure relates to a lamp for a vehicle, and more particularly, to a lamp for a vehicle which is capable of preventing occurrence of a blind zone caused by a defect.

2. Description of the Related Art

Generally, a vehicle includes lamps having an illumination function for recognizing an object disposed proximate to the vehicle during low light condition (e.g., night) or a signaling function for informing other vehicles or road users proximate to the vehicle of a driving state of the vehicle.

For example, a headlamp, a fog lamp, and the like generally have the illumination function. A turn signaling lamp, a tail lamp, a brake lamp, a side marker lamp, and the like generally have the signaling function.

Among lamps for a vehicle, a headlamp emits light forward from a vehicle to provide a driver with a front field of vision during nighttime driving or driving through a dark place such as a tunnel and the like, which is significant in ensuring safe driving.

The headlamp forms a variety of beam patterns such as a low beam pattern, a high beam pattern, and the like based on a driving environment of a vehicle. The low beam pattern has a cut-off line having a certain shape to prevent a driver of a vehicle in front from being blinded.

In particular, the headlamp typically includes a shield which obstructs a portion of light emitted forward from the vehicle to form a cut-off line of a low beam pattern and a variety of components such as an actuator and the like for operating the shield for conversion of a beam pattern. However, when a defect occurs in a component included in the headlamp, an unnecessary blind zone occurs in the beam pattern such that not only a field of vision of a driver may be degraded but also costs may increase due to replacement of the component with the defect.

Accordingly, a method of preventing degradation in a field of vision of a driver and preventing an increase in costs for replacement by preventing a blind zone caused by a defect is required.

The above information disclosed in this section is merely for enhancement of understanding of the background of the disclosure and therefore it may contain information that does not form the prior art that is already known in this country to a person of ordinary skill in the art.

SUMMARY

Aspects of the present disclosure provide a lamp for a vehicle which is capable of preventing a blind zone which occurs in a beam pattern due to a defect.

The objects of the present disclosure are not limited to the above-described objects, and other objects of the present disclosure will be apparent to those skilled in the art from the following descriptions.

According to the aspects of the present disclosure, a lamp for a vehicle may include a light source portion with a plurality of light emitting areas in which generated brightness of generated light is separately controllable and a brightness controller which is configured to cause the plurality of light emitting areas to generate light at a first brightness level to form a beam pattern and to cause at least one of the light emitting areas, which is disposed proximate to a defective area which includes at least one faulty area, to generate light at a second brightness level.

In particular, the first brightness level may be lower than a maximum brightness level, and the second brightness level may be higher than the first brightness level. The second brightness level may include at least one of a plurality of brightness levels that are higher than the first brightness level.

The defective area may include a single faulty area or a plurality of faulty areas disposed adjacently. The brightness controller is configured to select at least one light emitting area disposed proximate to the defective area as a compensating area and may cause the at least one compensating area to generate light at the second brightness level. The at least one compensating area may be one of the plurality of light emitting areas which abut at least one side of the at least one faulty area included in the defective area.

A number of the compensating areas may be equal to or great than the number of the faulty areas included in the defective area. However, when the number of the compensating areas is less than a preset number, the brightness controller may further select at least one light emitting area disposed proximate to the at least one compensating area as an additional compensating area and may cause the at least one additional compensating area to generate light at the second brightness level. Here, the at least one additional compensating area may be one of the plurality of light emitting areas that abuts at least one side of the at least one compensating area.

In addition, the light source portion of the lamp may include a plurality of micro mirrors as the plurality of light emitting areas, and the brightness controller may control brightness of light by adjusting an operating frequency applied to each of the plurality of micro mirrors such that a period in which each of the plurality of micro mirrors is turned on/off is adjusted. Alternatively, the light source portion may include a plurality of light sources as the plurality of light emitting areas, and the brightness controller may control brightness of light by adjusting a duty ratio of an operating signal applied to each of the plurality of light sources. Further, the light source portion may include a light source and a liquid crystal panel with a plurality of light transmission areas in which a light transmission rate varies based on an applied voltage, and the brightness controller may control a light transmission rate of each of the plurality of light transmission areas by adjusting a voltage applied to each of the plurality of light transmission areas.

Additionally, the lamp may include a defect detector for detecting the defective area, and the defect detector may detect the defective area from a blind zone included in the beam pattern formed by the light source portion.

Details of other examples are included in a detailed description and drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
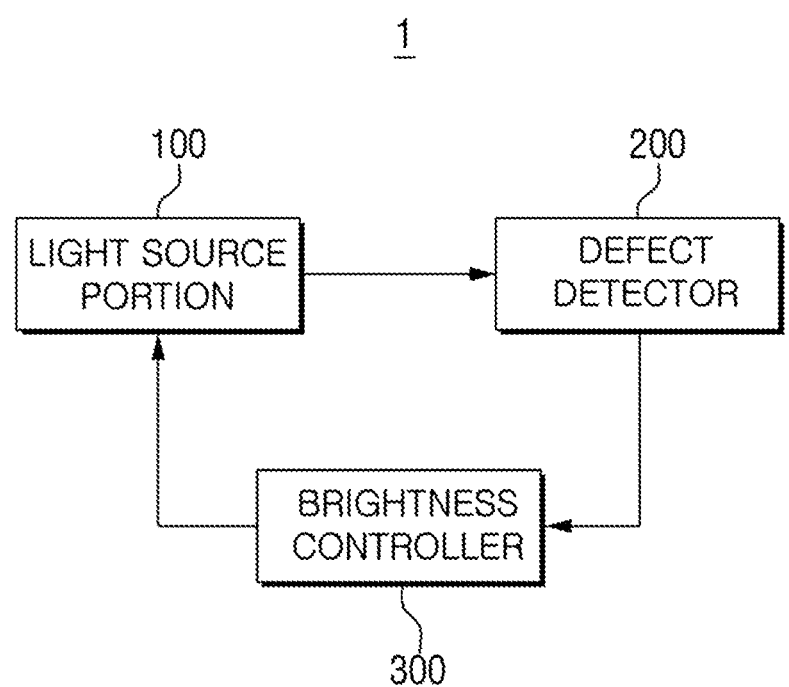
FIG. 1 is a block diagram illustrating a configuration of a lamp for a vehicle according to some exemplary embodiments of the present disclosure.

Advantages and features of the present disclosure and a method of achieving the same will become apparent with reference to the attached drawings and embodiments described below in detail. However, the present disclosure is not limited to the embodiments described below and may be embodied with a variety of different modifications. The embodiments are merely provided to allow one of ordinary skill in the art to completely understand the scope of the present disclosure and are defined by the scope of the claims. Throughout the specification, like reference numerals refer to like elements.

Accordingly, in some embodiments, well-known operations of a process, well-known structures, and well-known technologies will be not described in detail to avoid obscuring of understanding the present disclosure.

The terms used herein are for explaining embodiments but are not intended to limit the present disclosure. Throughout the specification, unless particularly defined otherwise, singular forms include plural forms. The terms "comprises" and/or "comprising" are used herein as meanings which do not exclude presence or addition of one or more other components, stages, operations, and/or elements in addition to stated components, stages, operations, and/or elements. Also, "and/or" includes each and one or more combinations of stated items.

Also, embodiments disclosed herein will be described with reference to perspective views, cross-sectional views, and/or schematic diagrams which are exemplary views of the present disclosure. Accordingly, modifications may be made in the forms of exemplary views by manufacturing technology, allowable error, and/or the like. Accordingly, the embodiments of the present disclosure will not be limited to particular forms shown in the drawings and include changes made by a manufacturing process. Also, throughout the drawings of the present disclosure, components may be slightly exaggerated or reduced in consideration of convenience of description. Throughout the specification, like reference numerals refer to like elements.

Hereafter, a lamp for a vehicle according to some exemplary embodiments of the present disclosure will be described with reference to the drawings.

FIG. 1 is a block diagram illustrating a configuration of a lamp for a vehicle according to some exemplary embodiments of the present disclosure. Referring to FIG. 1, a lamp 1 for a vehicle according to some exemplary embodiments of the present disclosure may include a light source portion 100, a defect detector 200, and a brightness controller 300.

In the exemplary embodiments of the present disclosure, a case in which the lamp 1 is used as one of headlamps installed on both sides of a front of a vehicle to ensure a front field of vision by emitting light in a driving direction of the vehicle will be described as an example. However, the present disclosure is not limited thereto, and the lamp 1 may be used as not only a headlamp but also any one of a variety of lamps installed in a vehicle, such as a daytime running lamp (DRL), a fog lamp, a position lamp, a turn-signal lamp, a tail lamp, a brake lamp, a backup lamp, and the like.

Also, in the exemplary embodiments of the present disclosure, a case in which the lamp 1 is used as a headlamp and forms a variety of beam patterns such as a low beam pattern, a high beam pattern, and the like according to a driving environment of a vehicle will be described as an example. However, the present disclosure is not limited thereto, and the lamp 1 according to some exemplary embodiments of the present disclosure may be used for performing two or more functions. In this case, a light amount, color, or the like may vary according to functions.

Figure 2:
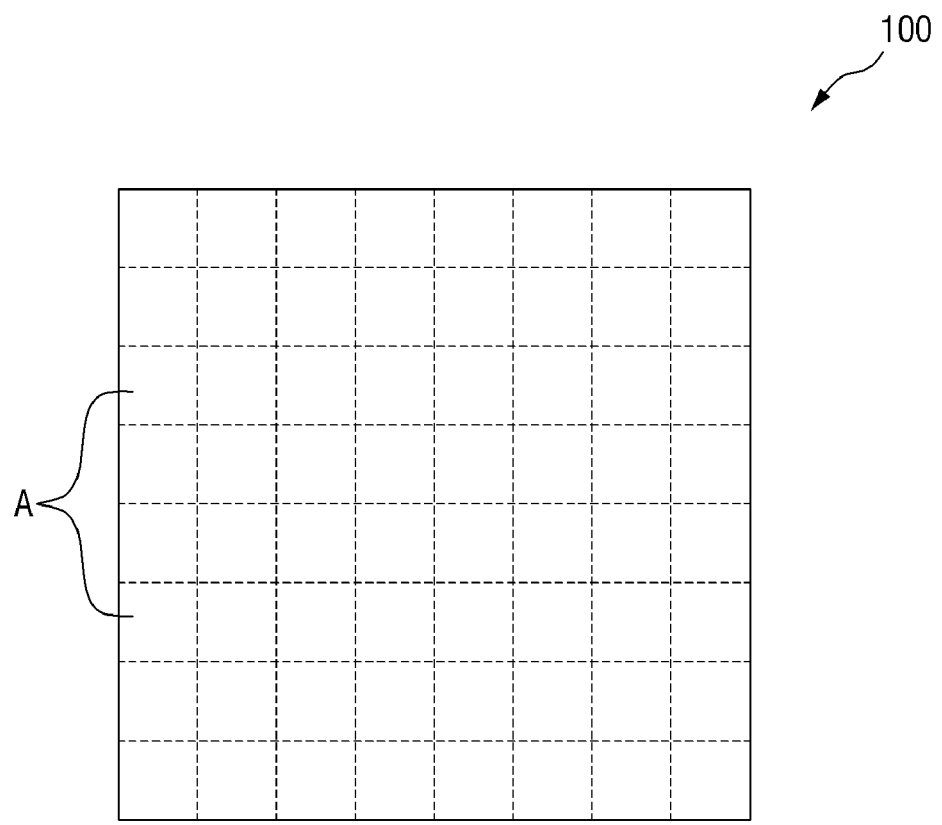
FIGS. 2 and 3 are schematic diagrams illustrating a light emitting area of a light source portion according to some exemplary embodiments of the present disclosure.

FIG. 2 is a schematic diagram illustrating a light emitting area of the light source portion according to some exemplary embodiments of the present disclosure. Referring to FIG. 2, the light source portion 100 according to some exemplary embodiments of the present disclosure may include a plurality of light emitting areas A and each of the plurality of light emitting areas A may form a pixel which constitutes a beam pattern formed by the lamp 1 according to some exemplary embodiments of the present disclosure.

The pixel which constitutes the beam pattern may be understood as a unit area of the beam pattern which is capable of separately controlling brightness (e.g., illuminance) of light. In this case, each of the plurality of light emitting areas A may be understood as the pixel capable of separately controlling brightness of light.

Light may be generated by at least one of the plurality of light emitting areas A according to the beam pattern formed by the lamp 1 according to some exemplary embodiments of the present disclosure. Each of the plurality of light emitting areas A may be formed to have the same size and may form one pixel. However, the present disclosure is not limited thereto, and the plurality of light emitting areas A may have different sizes.

Figure 3:
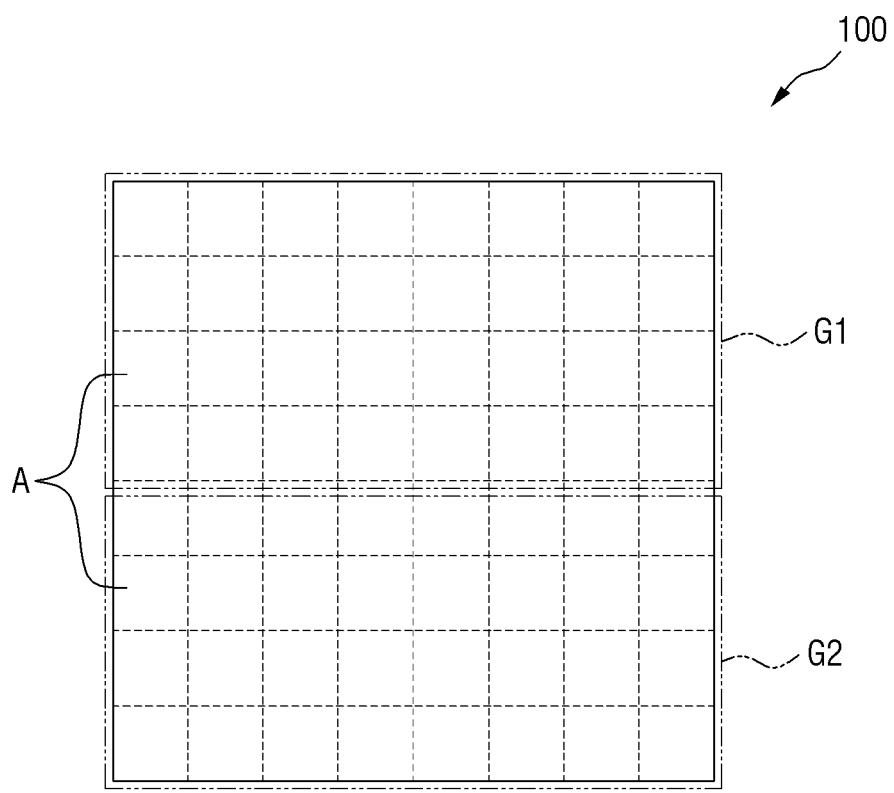

For example, when the lamp 1 according to some exemplary embodiments of the present disclosure is used as a headlamp and forms a low beam pattern having a certain cut-off line to prevent a driver of a vehicle in front or a vehicle in an opposite lane from being blinded, as shown in FIG. 3, light is generated in one of the plurality of light emitting areas A which is included in a first group G1 but light is not generated in another of the plurality of light emitting areas A which is included in a second group G2.

In particular, the first group G1 which forms the low beam pattern may be disposed on top because an area toward which the light, having passed through a lens, is emitted may be shown as an inverted image when a projection lens is used as the lens.

Further, light emitting areas included in the first group G1 and the second group G2 may vary based on a beam pattern formed by the lamp 1 according to some exemplary embodiments of the present disclosure, and any one of the first group G1 and the second group G2 may be omitted.

Figure 4:
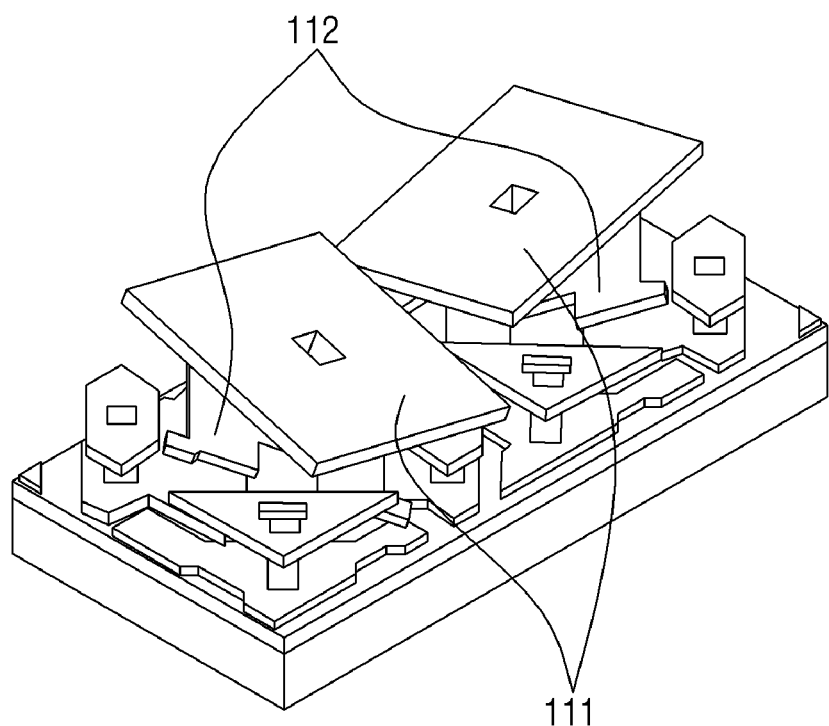
FIG. 4 is a perspective view illustrating the light source portion according to some exemplary embodiments of the present disclosure.

FIG. 4 is a perspective view illustrating the light source portion according to some exemplary embodiments of the present disclosure. Referring to FIG. 4, the light source portion 100 according to some exemplary embodiments of the present disclosure may include a plurality of micro mirrors 111 and each of the plurality of light emitting areas A may be formed by at least one of the plurality of micro mirrors 111. Here, the number of micro mirrors included in the light source portion 110 may vary based on the number, size, or the like of the plurality of light emitting areas A.

Each of the plurality of micro mirrors 111 may be rotated by a driving portion 112 to a predetermined angle and may be in any one of an ON state and an OFF state based on a rotational angle. The ON state may be a state which allows reflected light to be incident onto a lens and the OFF state may be a state which does not allow reflected light to be incident onto a lens. When the lamp 1 according to some exemplary embodiments of the present disclosure is used as a headlamp, the ON state may be a state in which reflected light is emitted toward a front of a vehicle and the OFF state may be a state in which reflected light is not emitted toward the front of a vehicle.

Figure 5:
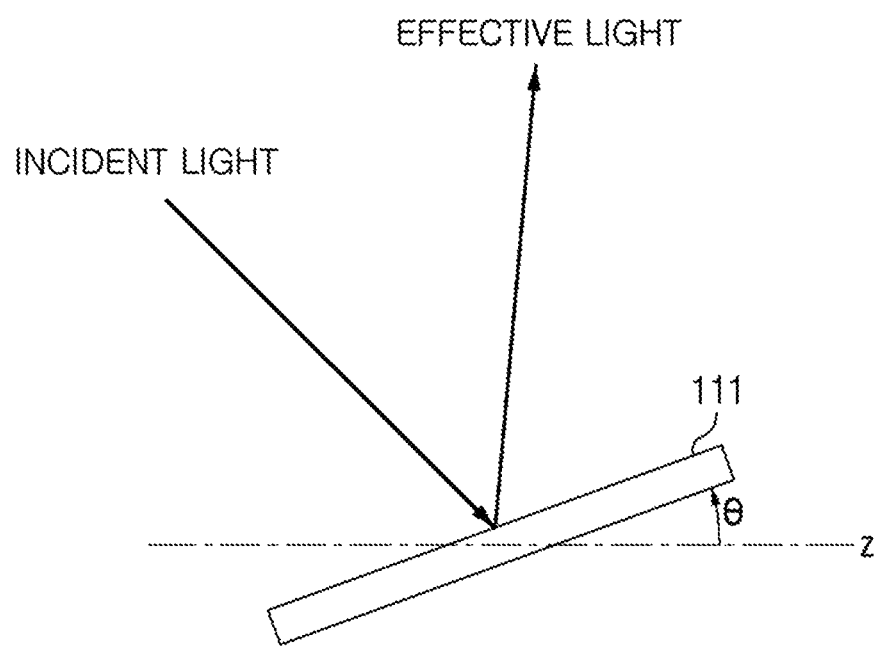
FIG. 5 is a schematic diagram illustrating a micro mirror in an ON state according to some exemplary embodiments of the present disclosure.
Figure 6:
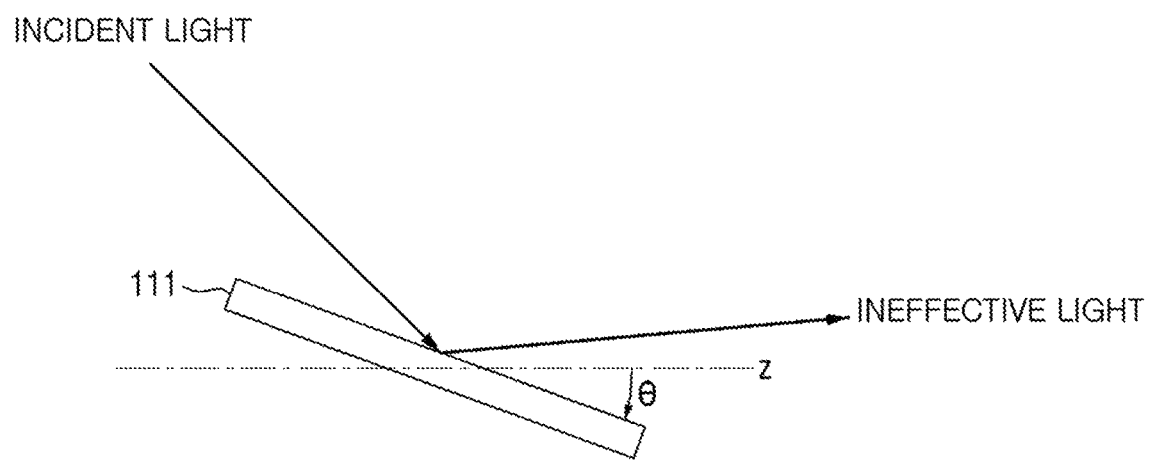
FIG. 6 is a schematic diagram illustrating the micro mirror in an OFF state according to some exemplary embodiments of the present disclosure.

For example, when each of the plurality of micro mirrors 111 is pivoted by the driving portion 112 to be oriented in one direction by an angle of 0° with respect to an x axis as shown in FIG. 5, each of the plurality of micro mirrors 111 may become the ON state in which incident light is reflected such that the incident light becomes effective light which is incident onto the lens. On the other hand, when each of the plurality of micro mirrors 111 is pivoted by the driving portion 112 to be oriented in the other direction at the angle of 0° with respect to the x axis as shown in FIG. 6, each of the plurality of micro mirrors 111 may become the OFF state in which incident light is not reflected such that the incident light becomes ineffective light which is not incident onto the lens.

When the plurality of micro mirrors 111 continuously remain in the ON state, the light source portion 100 may generate the light that has uniform light and brightness. The generated light may be adjusted according to an operating frequency applied to allow the plurality of micro mirrors 111 to be turned on/off at predetermined cycles for a unit time.

As the operating frequency applied to the plurality of micro mirrors 111 increases, the light source portion 100 may generate light having high illuminance. The reason may be that a time in which the plurality of micro mirrors 111 are turned off is relatively decreased such that an averaged overall brightness may be perceived as being increased.

Further, one of the plurality of micro mirrors 111, to which the operating frequency is applied, may be a micro mirror included in the above-described first group G1. Also, a micro mirror included in the second group G2 may remain in the OFF state.

Figure 7:
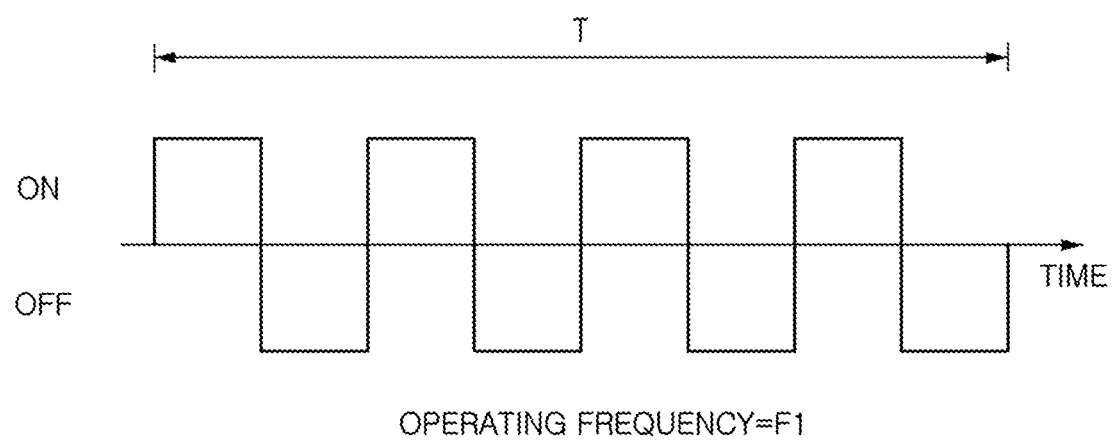
FIGS. 7 and 8 are schematic diagrams illustrating an operating frequency which is applied to the micro mirror according to some exemplary embodiments of the present disclosure.
Figure 8:
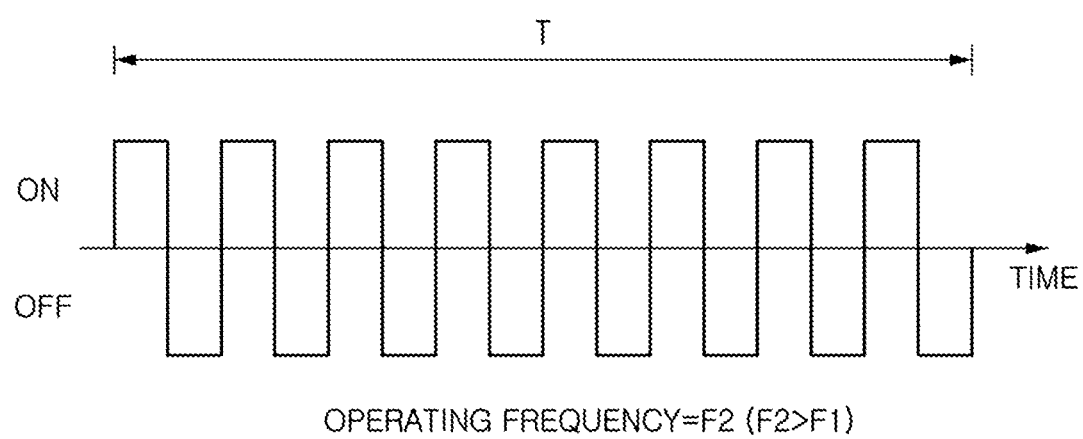

For example, when an operating frequency, which is the number of times in which the plurality of micro mirrors 111 are turned on for a unit time T, of F2 that is higher than the operating frequency F1 is applied as shown in FIG. 7, since the number of times in which the plurality of micro mirrors 111 are turned on increases as shown in FIG. 8, it may be perceived that the average overall brightness increases.

In other words, as a cycle at which the plurality of micro mirrors 111 are turned on/off during the unit time T decreases, a time in which the plurality of micro mirrors 111 are turned off also decreases. Consequently, a time in which it may be recognized that the plurality of micro mirrors 111 are in the OFF state is decreased such that the brightness may be relatively perceived as becoming high.

Accordingly, the illuminance of the light generated by the light source portion 100 may be adjusted by changing the operating frequency applied to the plurality of micro mirrors 111 based on the usage of the lamp 1 according to some exemplary embodiments of the present disclosure.

Figure 9:
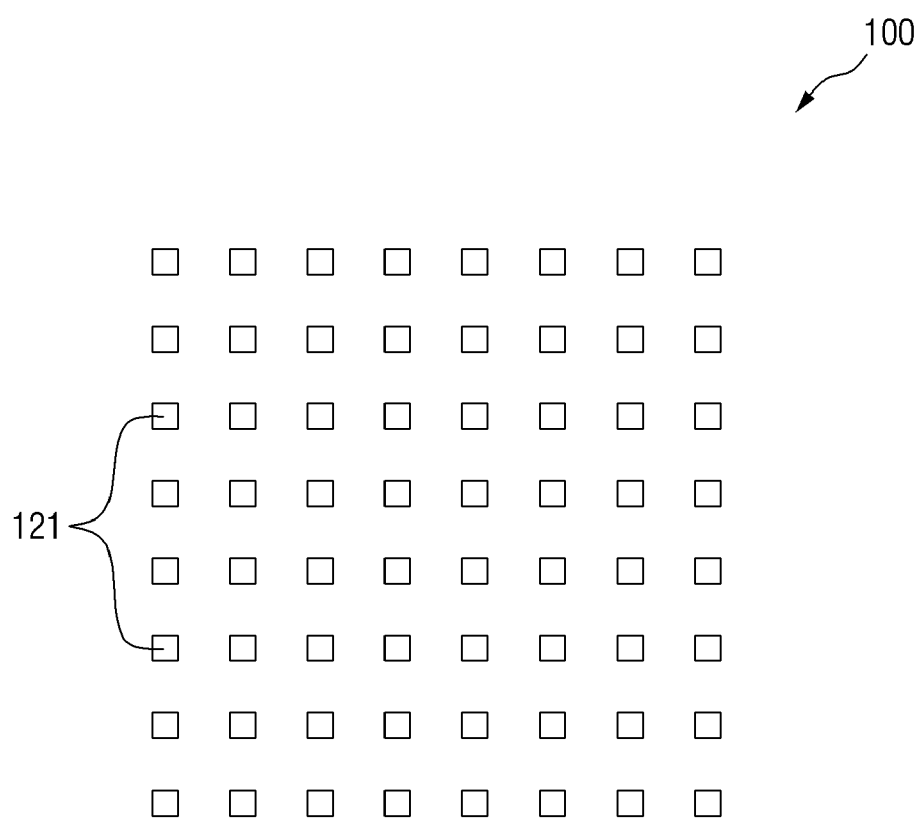
FIG. 9 is a schematic diagram illustrating a light source portion according to other exemplary embodiments of the present disclosure.

FIG. 9 is a schematic diagram illustrating a light source portion according to other exemplary embodiments of the present disclosure. Referring to FIG. 9, according to other exemplary embodiments of the present disclosure, the light source portion 100 may include a plurality of light sources 121. In other exemplary embodiments of the present disclosure, micro light emitting diodes (LEDs) which have a length 1/10 of general LEDs, an area 1/100 thereof, and a size of about 10 to 100 micrometers may be used as the plurality of light sources 121.

Each of the plurality of light emitting areas A may be formed by at least one of the plurality of light sources 121, and brightness of the light generated by each of the plurality of light emitting areas A may vary based on a duty ratio of an operating signal applied to each of the plurality of light sources 121.

Figure 10:
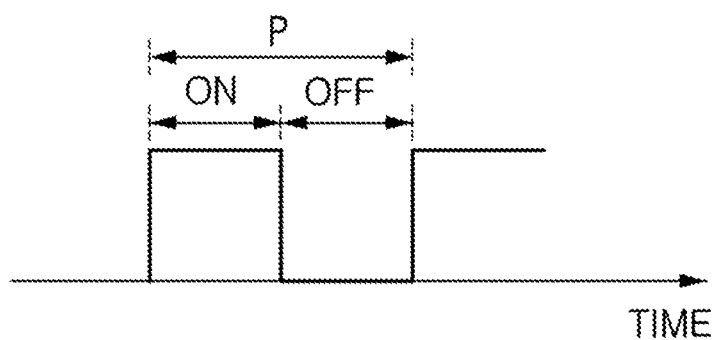
FIG. 10 is a schematic diagram illustrating an operating frequency which is applied to a light source according to other exemplary embodiments of the present disclosure.

In the operating signal applied to each of the plurality of light sources 121, as shown in FIG. 10, the brightness may be adjusted based on the duty ratio which indicates a ratio between an ON segment and an OFF segment during a predetermined period P and the brightness may increase as the ON segment becomes longer.

Figure 11:
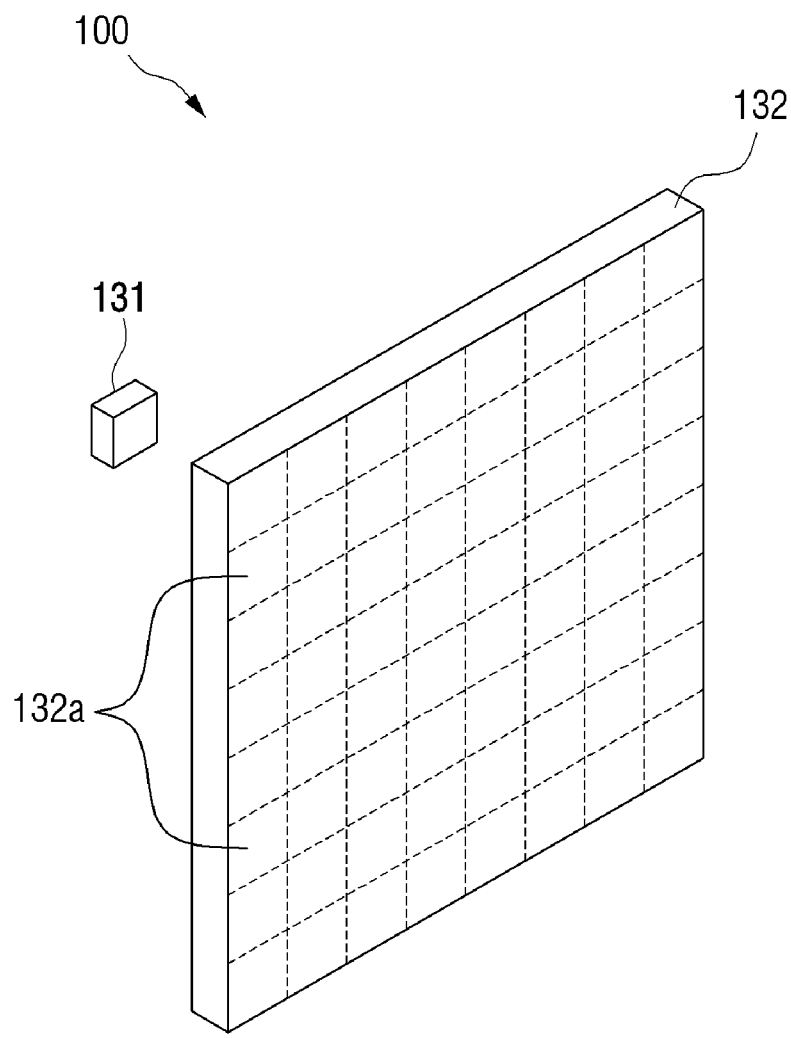
FIG. 11 is a schematic diagram illustrating a light source portion according to still other exemplary embodiments of the present disclosure.

FIG. 11 is a schematic diagram illustrating a light source portion according to still other exemplary embodiments of the present disclosure. Referring to FIG. 11, the light source portion 100 may include a light source 131 and a liquid crystal panel 132. The liquid crystal panel 132 may include a plurality of light transmission areas 132a, and each of the light emitting areas A may be formed by at least one of the plurality of light transmission areas 132a.

A light transmission rate may be adjusted based on an arrangement direction of liquid crystals based on an applied voltage in each of the plurality of light transmission areas 132a, and the brightness of the light generated from each of the plurality of light transmission areas 132a may vary according to the light transmission rate of each of the plurality of light transmission areas 132a.

The light source portion 100 is not limited to the above-described embodiments and may include a variety of components which may form the plurality of light emitting areas A. The light source portion 100 is capable of controlling the brightness of the light generated by each of the light emitting areas A.

Figure 12:
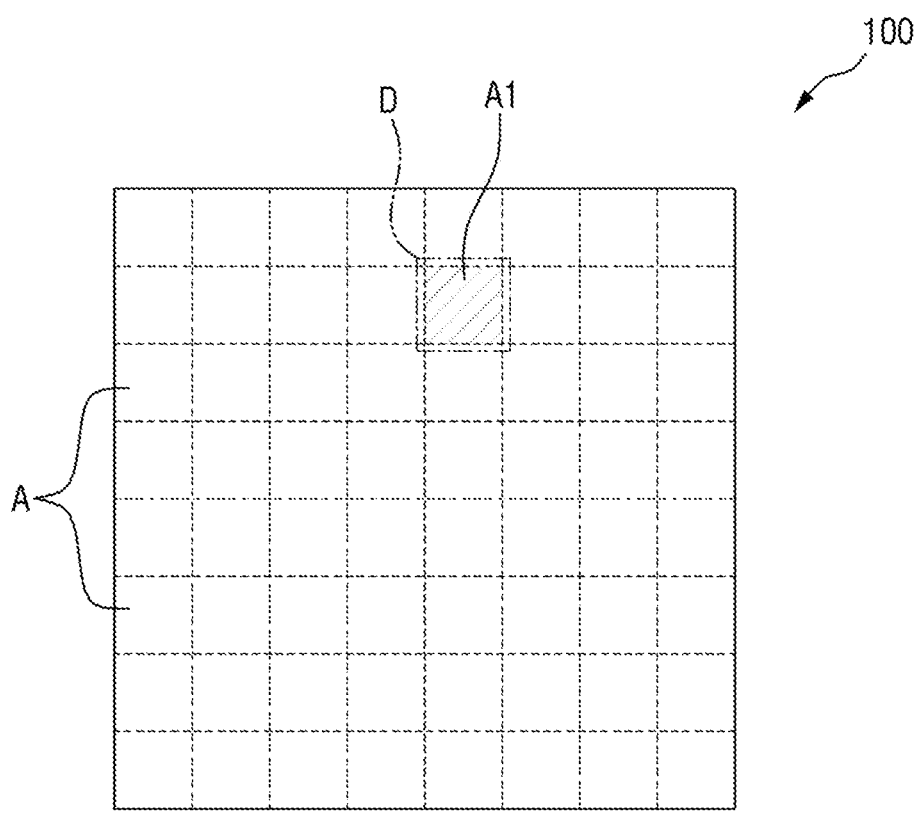
FIGS. 12 and 13 are schematic diagrams illustrating a defective area according to some exemplary embodiments of the present disclosure.
Figure 13:
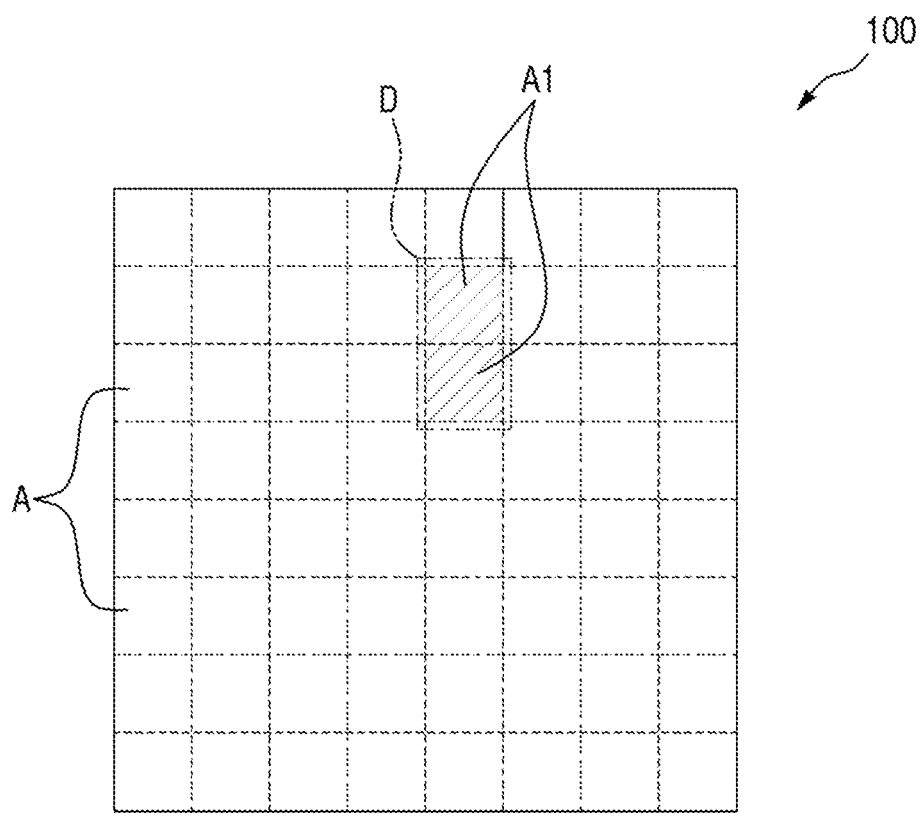
Figure 13:

The defect detector, as shown in FIGS. 12 and 13, may detect a defective area D which includes at least one faulty area A1 with a defect among the plurality of light emitting areas A.

When the plurality of micro mirrors 111 are used as the light source portion 100, the faulty area A1 may be formed by defects of some of the plurality of micro mirrors 111. When the plurality of light sources 121 are used as the light source portion 100, the faulty area A1 may be formed by defects of some of the plurality of light sources 121. When the liquid crystal panel 132 is used as the light source portion 100, the faulty area A1 may be formed by defects of some of the plurality of light transmission areas 132a.

Particularly, FIG. 12 illustrates an example in which the defective area D includes a single faulty area A1, and FIG. 13 illustrates an example in which the defective area D includes a plurality of such faulty areas A1 which are present adjacently in at least one direction.

The defect detector 200 may detect the defective area D on the basis of a blind zone formed in the light generated by the light source portion 100 or in the beam pattern formed by the light source portion 100.

In some exemplary embodiments of the present disclosure, the defect detector 200 may obtain an image of the light generated by the light source portion 100 or the beam pattern formed by the light source portion 100 to detect the defective area D. However, the present disclosure is not limited thereto, and information on the defective area D may be previously provided by a manufacturer of the light source portion 100.

The brightness controller 300 may control the brightness of the light generated by each of the plurality of light emitting areas A. To form a certain beam pattern by using the light source portion 100, the brightness controller 300 may control to generate the light having a first brightness level that is lower than a maximum brightness level among the brightness levels of the light which may be generated by each of the plurality of light emitting areas A.

The first brightness level may be understood as the brightness level of the light which is to be generated when a beam pattern adequate for the usage of the lamp 1 according to some exemplary embodiments of the present disclosure is formed with all of the plurality of light emitting areas A being normal.

When the defective area D which includes at least one faulty area A1 is detected by the defect detector 200, since a blind zone caused by the defective area D may be formed in the beam pattern formed by the lamp 1 according to some exemplary embodiments of the present disclosure and may degrade a field of vision of a driver, the brightness controller 300 may compensate for the blind zone caused by the defective area D.

For this, in some exemplary embodiments of the present disclosure, the brightness controller 300 may select at least one light emitting area that abuts at least one side of the defective area D as a compensating area and increase the brightness of the light generated by the selected compensating area to prevent a blind zone caused by the defective area D from being formed in a beam pattern.

Figure 14:
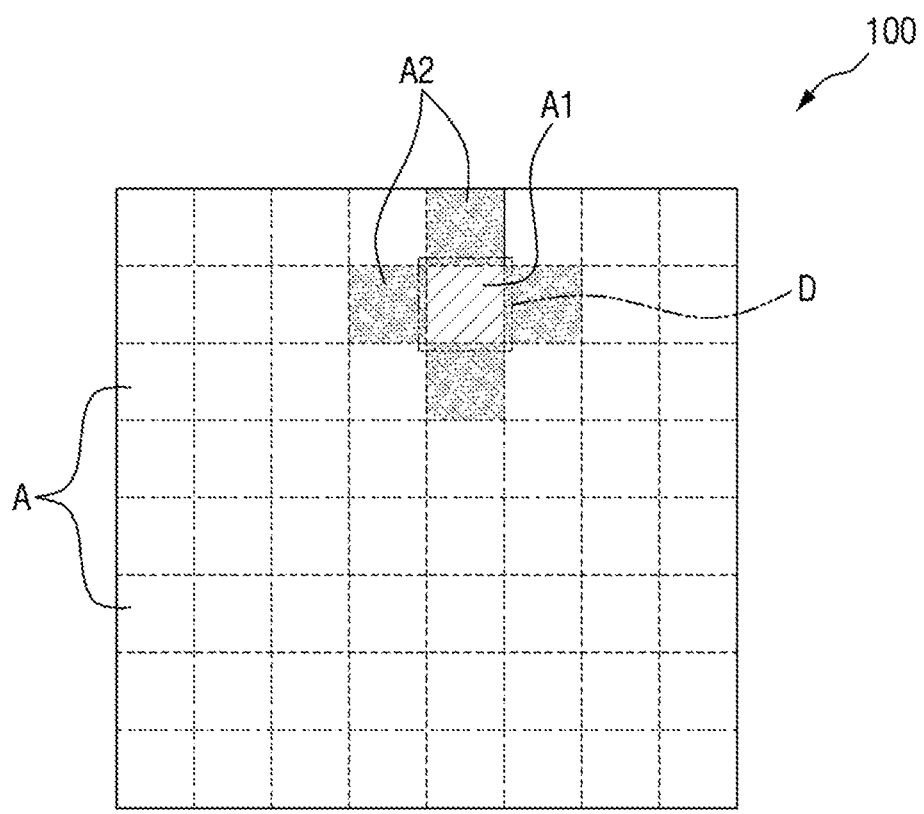
FIGS. 14 to 17 are schematic diagrams illustrating compensating areas for compensating the defective area according to some exemplary embodiments of the present disclosure.
Figure 15:
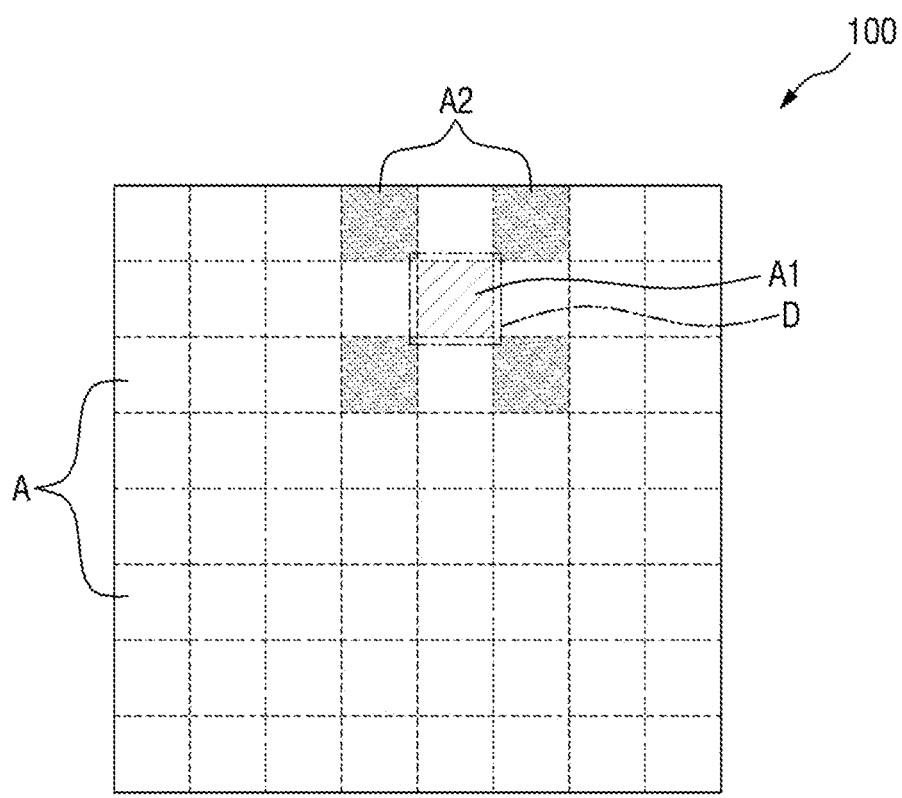
Figure 16:
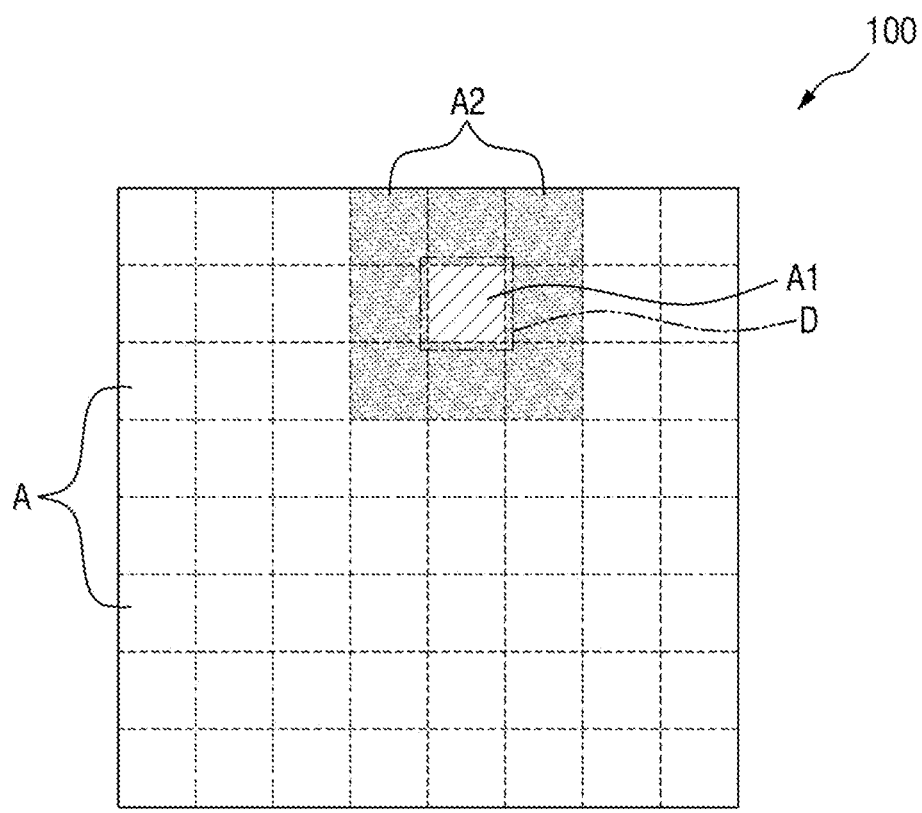

As shown in FIGS. 14 to 16, the brightness controller 300 may select at least one light emitting area that abuts at least one side of the defective area D as a compensating area A2 and may compensate for the blind zone caused by the defective area D by allowing the selected at least one compensating area A2 to generate light at a second brightness level that is higher than the first brightness level.

FIGS. 14 to 16 illustrate an example in which the defective area D includes a single faulty area A1. In this case, the brightness controller 300 may select light emitting areas disposed in upward, downward, leftward, and rightward directions with respect to the defective area D as the compensating areas A2 to generate the light at the second brightness level as shown in FIG. 14. The brightness controller 300 may select light emitting areas disposed in diagonal directions with respect to the defective area D as the compensating areas A2 to generate the light at the second brightness level as shown in FIG. 15. The brightness controller 300 may select all light emitting areas that abut the defective area D as the compensating areas A2 to generate the light at the second brightness level as shown in FIG. 16.

Here, the selection criteria by which the brightness controller 300 selects the compensating area to compensate for a blind zone generated by the defective area D are not limited to the above descriptions with reference to FIGS. 14 to 16, and the number, positions, or the like of the compensating areas selected by the brightness controller 300 may vary as necessary.

As described with reference to FIGS. 14 to 16, a case in which the light at the second brightness level is generated in the compensating area A2 will be described as follows. When the light source portion 100 includes the plurality of micro mirrors 111 as described with reference to FIG. 4, the brightness controller may apply a second operating frequency to one of the plurality of micro mirrors 111 which corresponds to the compensating area A2 to generate the light at the second brightness level that is higher than the first brightness level as described with reference to FIG. 8.

In other words, the brightness controller 300 may apply a first operating frequency for generating light at the first level to one of the plurality of micro mirrors 111, which is in a normal state. However, the brightness controller 300 may apply the second operating frequency for compensating a blind zone caused by the defective area D to a micro mirror corresponding to the compensating area A2 to generate the light at the second brightness level that is higher than the first brightness level.

Further, when the light source portion 100 includes the plurality of light sources 121 as described with reference to FIG. 9, the brightness controller 300 may increase the duty ratio of the operating signal applied to one of the plurality of light sources 121, which corresponds to the compensating area A2, to generate the light at the second brightness level that is higher than the first brightness level.

Also, when the light source portion 100 includes the light source 131 and the liquid crystal panel 132 as described with reference to FIG. 11, the brightness controller 300 may increase the light transmission rate of one of the plurality of light transmission areas 132a, which corresponds to the compensating area A2, to generate the light at the second brightness level that is higher than the first brightness level.

In the above-described exemplary embodiments, the light at or above the first brightness level, i.e., the second brightness level, may be generated by the compensating area A2. However, the present disclosure is not limited thereto, and the second brightness may include a plurality of brightness levels that are higher than the first brightness level, and a brightness level of the light generated by each of the compensating areas A2 may be any one of the plurality of brightness levels that are higher than the first brightness level.

Here, the number of the compensating areas A2 may be greater than or equal to the number of faulty areas A1 as a blind zone may not be adequately compensated when the number of the compensating areas A2 is less than the number of the faulty areas A1.

Figure 17:
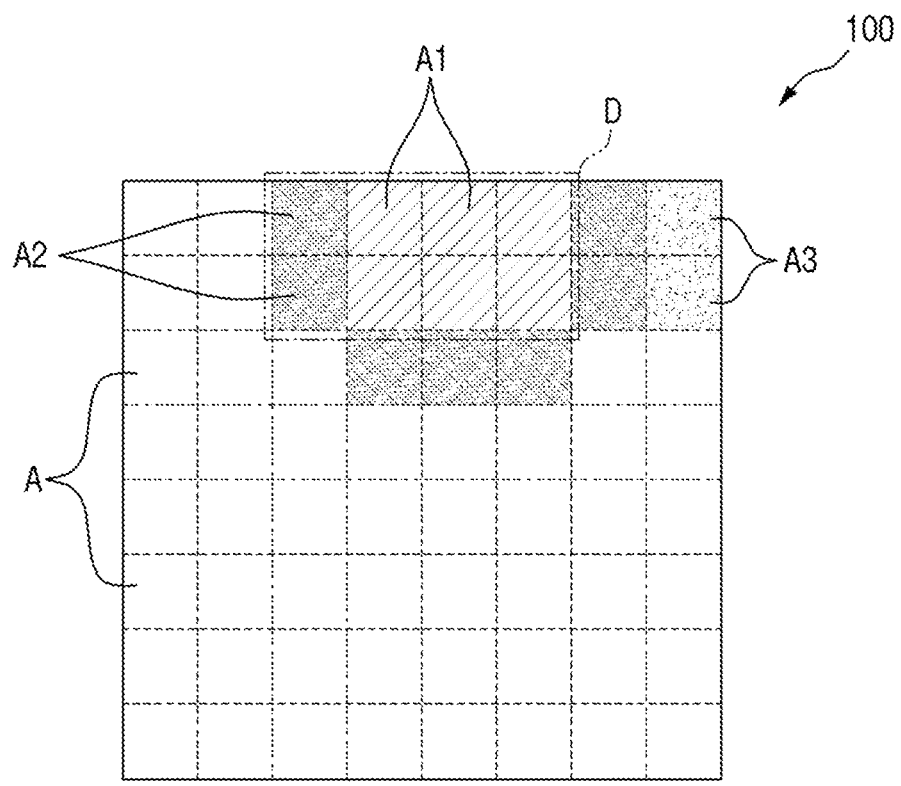

Meanwhile, when the defective area D which includes a plurality of such faulty areas A1 disposed adjacently as shown in FIG. 17 is detected, similar to the above description with reference to FIGS. 14 to 16, the brightness controller 300 may select at least one light emitting area that abuts one side of the defective area D as the compensating area A2 to generate light at a brightness level that is higher than the first brightness level.

Here, in the above description with reference to FIGS. 14 to 17, when the number of the selected compensating areas A2 is less than a preset number, at least one light emitting area adjacent to the compensating area A2 may be selected as an additional compensating area A3 to generate light at a brightness level that is higher than the first brightness level.

For example, as shown in FIG. 17, when the number of the compensating areas A2 selected for compensating the blind zone caused by the faulty areas A1 included in the defective area D is less than the preset number, at least one light emitting area that abuts at least one side of the compensating area A2 may be selected as the additional compensating area A3 to generate light at a brightness level that is higher than the first brightness level. Here, brightness levels of light generated by the compensating area A2 and the additional compensating area A3 may be equal or may differ from each other.

As described above, the lamp 1 according to some exemplary embodiments of the present disclosure may prevent a blind zone caused by the defective area D that includes the faulty area A1 among the plurality of light emitting areas A by allowing at least one light emitting area disposed proximate to the defective area D to generate light having a brightness higher than the brightness for forming a beam pattern to prevent occurrence of the blind zone caused by the defective area D.

Additionally, since the blind zone may be prevented from occurring as described above and the light source portion 100 which includes the defective area D may be reused although the light source portion 100 includes the defective area D, a cost increase that may be caused by replacement of the light source portion 100 including the defective area D and the like, may be prevented.

According to the exemplary embodiments of the present disclosure, a lamp for a vehicle may provide one or more effects as follows.

Since a blind zone caused by a defective area may be prevented by increasing the brightness of one of a plurality of light emitting areas, which is disposed proximate to the defective area, a degradation in a field of vision of a driver may be prevented and costs for replacement and the like may be avoided.

Effects of the present disclosure will not be limited to the above-mentioned effects and other unmentioned effects will be clearly understood by those skilled in the art from the following claims.

It should be understood by one of ordinary skill in the art that the present disclosure can be embodied in other specific forms without changing the technical concept and essential features of the present disclosure. Therefore, the above-described embodiments should be understood to be exemplary and not limiting in every aspect. The scope of the present disclosure will be defined by the following claims rather than the above detailed description, and all changes and modifications derived from the meaning and the scope of the claims and equivalents thereof should be understood as being included in the scope of the present disclosure.

What is claimed is:

1. A lamp for a vehicle, comprising:
    a light source portion which includes a plurality of light emitting areas in which brightness of generated light is separately controllable; and
    a brightness controller which is configured to cause the plurality of light emitting areas to generate light at a first brightness level to form a beam pattern and to cause at least one of the plurality of light emitting areas, which is disposed proximate to a defective area which includes at least one faulty area, to generate light at a second brightness level.

2. The lamp of claim 1, wherein the first brightness level is lower than a maximum brightness level.

3. The lamp of claim 1, wherein the second brightness level is higher than the first brightness level.

4. The lamp of claim 3, wherein the second brightness level comprises at least one of a plurality of brightness levels that are higher than the first brightness level.

5. The lamp of claim 1, wherein the defective area comprises a single faulty area or a plurality of faulty areas disposed adjacently.

6. The lamp of claim 1, wherein the brightness controller selects at least one light emitting area disposed proximate to the defective area as a compensating area and causes the at least one compensating area to generate light at the second brightness level.

7. The lamp of claim 6, wherein the at least one compensating area is one of the plurality of light emitting areas which abut at least one side of the at least one faulty area included in the defective area.

8. The lamp of claim 6, wherein a number of the compensating areas is equal to or great than the number of the faulty areas included in the defective area.

9. The lamp of claim 6, wherein when the number of the compensating areas is less than a preset number, the brightness controller selects at least one light emitting area disposed proximate to the at least one compensating area as an additional compensating area and causes the at least one additional compensating area to generate light at the second brightness level.

10. The lamp of claim 9, wherein the at least one additional compensating area is one of the plurality of light emitting areas that abuts at least one side of the at least one compensating area.

11. The lamp of claim 1, wherein the light source portion comprises a plurality of micro mirrors as the plurality of light emitting areas, and the brightness controller controls brightness of light by adjusting an operating frequency applied to each of the plurality of micro mirrors such that a period in which each of the plurality of micro mirrors is turned on/off is adjusted.

12. The lamp of claim 1, wherein the light source portion comprises a plurality of light sources as the plurality of light emitting areas, and the brightness controller controls brightness of light by adjusting a duty ratio of an operating signal applied to each of the plurality of light sources.

13. The lamp of claim 1, wherein the light source portion comprises a light source and a liquid crystal panel that includes a plurality of light transmission areas in which a light transmission rate varies based on an applied voltage, and the brightness controller controls a light transmission rate of each of the plurality of light transmission areas by adjusting a voltage applied to each of the plurality of light transmission areas.

14. The lamp of claim 1, further comprising a defect detector which detects the defective area,
    wherein the defect detector detects the defective area from a blind zone included in the beam pattern formed by the light source portion.

* * * * *